WILLIAM K. HARRELL.

Improvement in Plows.

No. 128,141. Patented June 18, 1872.

Witnesses:
P. C. Dieterich
Gustave Dieterich

Inventor:
William K. Harrell
Per Munn & Co.
Attorneys.

UNITED STATES PATENT OFFICE.

WILLIAM K. HARRELL, OF CLARINDA, IOWA, ASSIGNOR TO HIMSELF, THOMAS B. CHAMBERLAIN, AND DEWITT C. CHAMBERLAIN, OF SAME PLACE.

IMPROVEMENT IN PLOWS.

Specification forming part of Letters Patent No. 128,141, dated June 18, 1872.

*To all whom it may concern:*

Specification describing a Sod-Plow, invented by WM. K. HARRELL, of Clarinda, in the county of Page and State of Iowa.

The invention will first be fully described and then clearly pointed out in the claim.

Figure 1:
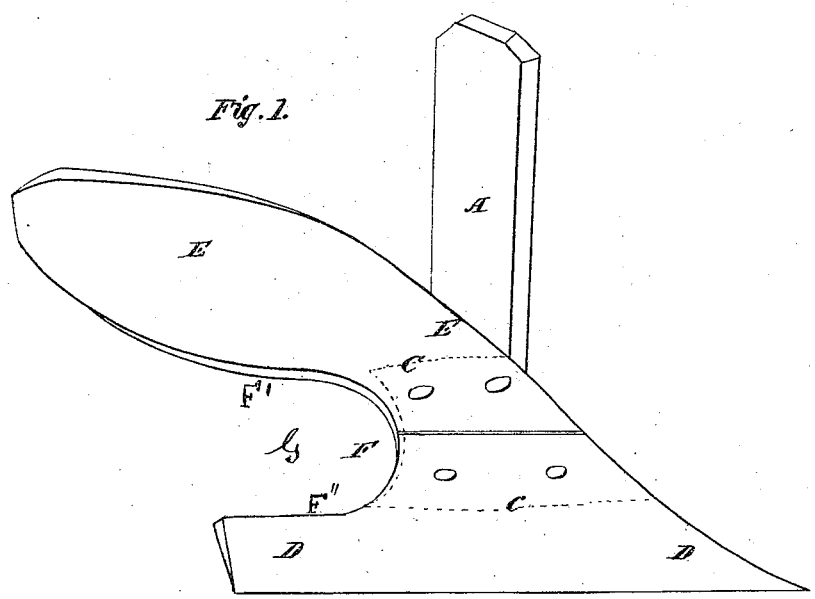
Figure 2:
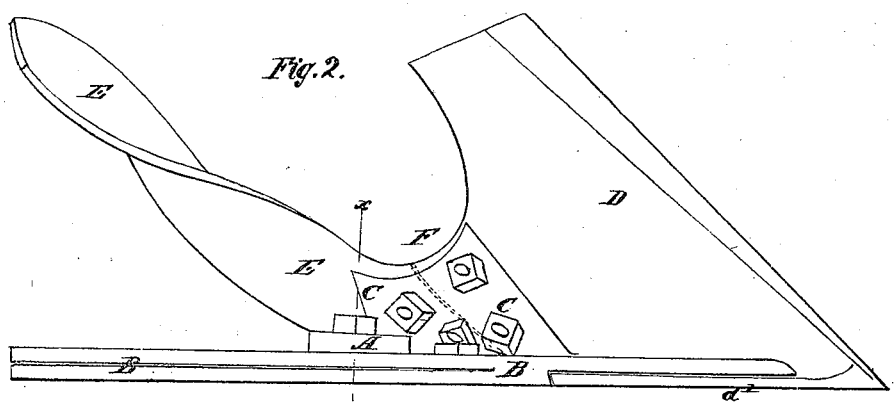
Figure 3:
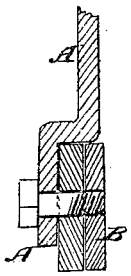

Figure 1 is a front perspective view of my plow. Fig. 2 is a bottom view.

A is the standard; B, the land-side; D, the share; and E, the mold-board.

My object is to construct and combine the share, mold-board, and land-side of a sod-plow so as to cut the sod with the share D before (or nearly so) it is lifted and turned over by the mold-board E. For this purpose I have exhibited in the drawing the edge of share D diverging from land-side B at an angle of fifty-two degrees, and having the length of edge to the maximum width between share and mold-board as fifteen to twelve. I have made this angle up to seventy degrees with equally good effect. The bottom of share is flat and rests firmly on the ground, while the upper part rises very gradually, so as not to tear the ground before the roots of grass and other growth are cut. It is recessed at the rear, as also is the mold-board E, so as to leave a cavity, F, between them, and thus prevent raising the sod toward the rear before the front has been cut. The mold-board E has an abrupt spiral form, so as to turn the sod quickly as soon as it lies loosely on the share.

The mode of operation is as follows: When the share D enters beneath a rectangular sod whose diagonal is fifteen inches and whose width is twelve inches, it cuts clean beneath this whole rectangle, or nearly so, and supports it upon its top surface before the mold-board performs its function of turning it over, which is then done with ease and thoroughness.

Having thus described all that is necessary to a full understanding of my invention, what I esteem to be new, and desire to secure by Letters Patent, is—

The combination, in a sod-plow, of the narrow mold-board E, flat share D, and land-side B, when each is relatively constructed and arranged to operate as and for the purpose described.

WILLIAM K. HARRELL.

Witnesses:
DEWITT C. CHAMBERLAIN,
THOMAS B. CHAMBERLAIN.